United States Patent
Long et al.

(10) Patent No.: US 8,129,983 B2
(45) Date of Patent: Mar. 6, 2012

(54) METHOD AND APPARATUS FOR CONTROLLING CHARGING OF A BATTERY IN A COMMUNICATION DEVICE

(75) Inventors: Bradley E. Long, Lawrenceville, GA (US); Daniel J. Jakl, Lawrenceville, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 270 days.

(21) Appl. No.: 12/432,116

(22) Filed: Apr. 29, 2009

(65) Prior Publication Data

US 2010/0277129 A1  Nov. 4, 2010

(51) Int. Cl.
*H02J 7/04* (2006.01)

(52) U.S. Cl. .................................... 324/150; 324/153

(58) Field of Classification Search .................. None
See application file for complete search history.

(56) References Cited

U.S. PATENT DOCUMENTS

| | | | |
|---|---|---|---|
| 5,200,689 A | | 4/1993 | Interiano et al. |
| 5,847,546 A | * | 12/1998 | Sengupta et al. ............. 320/144 |
| 5,883,493 A | * | 3/1999 | Koenck ........................ 320/114 |
| 5,945,811 A | * | 8/1999 | Hasegawa et al. ............ 320/141 |
| 6,707,272 B1 | | 3/2004 | Thandiwe |
| 2001/0033169 A1 | * | 10/2001 | Singh et al. ................... 324/426 |

* cited by examiner

OTHER PUBLICATIONS

Maxim Datasheet for DS2438—http://www.maxim-ic.com/quick_view2.cfm?qv_pk=2919—Jul. 2005—2 pages.

*Primary Examiner* — Minh N Tang
(74) *Attorney, Agent, or Firm* — Barbara R. Doutre

(57) ABSTRACT

The application discloses a method and apparatus for controlling the charging of a battery in a communication device. The method includes sensing temperature of the battery while charging the battery, and determining that the temperature is greater than a predetermined temperature threshold value. The method then includes monitoring a charging status of the battery when the determined temperature is greater than the predetermined temperature threshold value. The charging status indicates an amount of charge in the battery. The method further includes determining that the amount of charge in the battery is less than a predetermined charge threshold value. The method then includes suspending charging of the battery, until the temperature falls below the predetermined temperature threshold value, when the determined amount of charge in the battery is less than the predetermined charge threshold value.

16 Claims, 3 Drawing Sheets

METHOD AND APPARATUS FOR CONTROLLING CHARGING OF A BATTERY IN A COMMUNICATION DEVICE

FIELD OF THE DISCLOSURE

The present disclosure relates generally to a communication device and more particularly to a method and apparatus for controlling charging of a battery in the communication device.

BACKGROUND

Rechargeable batteries are typically used as a source of power to a communication device. The rechargeable batteries, such as Nickel batteries, Lithium batteries, etc. are capable of providing power to the communication device for several hours. Since the rechargeable batteries have limited life span, it is highly desirable to maximize the life of each battery and to obtain maximum power from each battery during every discharge cycle. To achieve these goals, it is necessary to fully and efficiently charge the battery.

Many battery chargers do not efficiently charge the rechargeable battery, because existing technology typically uses the rate of rise of temperature over time to determine that the rechargeable battery is fully charged. There are also many external factors, beyond the reactions within the battery cells, which can potentially influence the battery temperature and prevent the charger from correctly charging the battery to the battery's full potential charge. Some of these factors include, but are not limited to added heat generated due to high impedance of the battery, changes in temperature of any physical mass attached to the battery, and changes in amount of energy delivered to the battery. These factors can be exacerbated when the battery is coupled to communication device during charging. As a result, false temperature determinations may occur which disable the battery charging even before the battery is fully charged, thereby preventing the battery from charging to its full potential.

Accordingly, there exists a need for a method and apparatus for controlling charging of the battery in the communication device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps and apparatus components related to controlling charging of a battery in a communication device. The present disclosure is directed towards a method for controlling the charging of a battery by using an internal fuel gauge. The method includes sensing temperature of the battery while charging the battery, and determining that the temperature is greater than a predetermined temperature threshold value. The method then includes monitoring a charging status of the battery when the determined temperature is greater than the predetermined temperature threshold value. The charging status indicates an amount of charge in the battery. The method further includes determining that the amount of charge in the battery is less than a predetermined charge threshold value. The method then includes discontinuing charging of the battery, until the temperature falls below the predetermined temperature threshold value, when the determined amount of charge in the battery is less than the predetermined charge threshold value.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
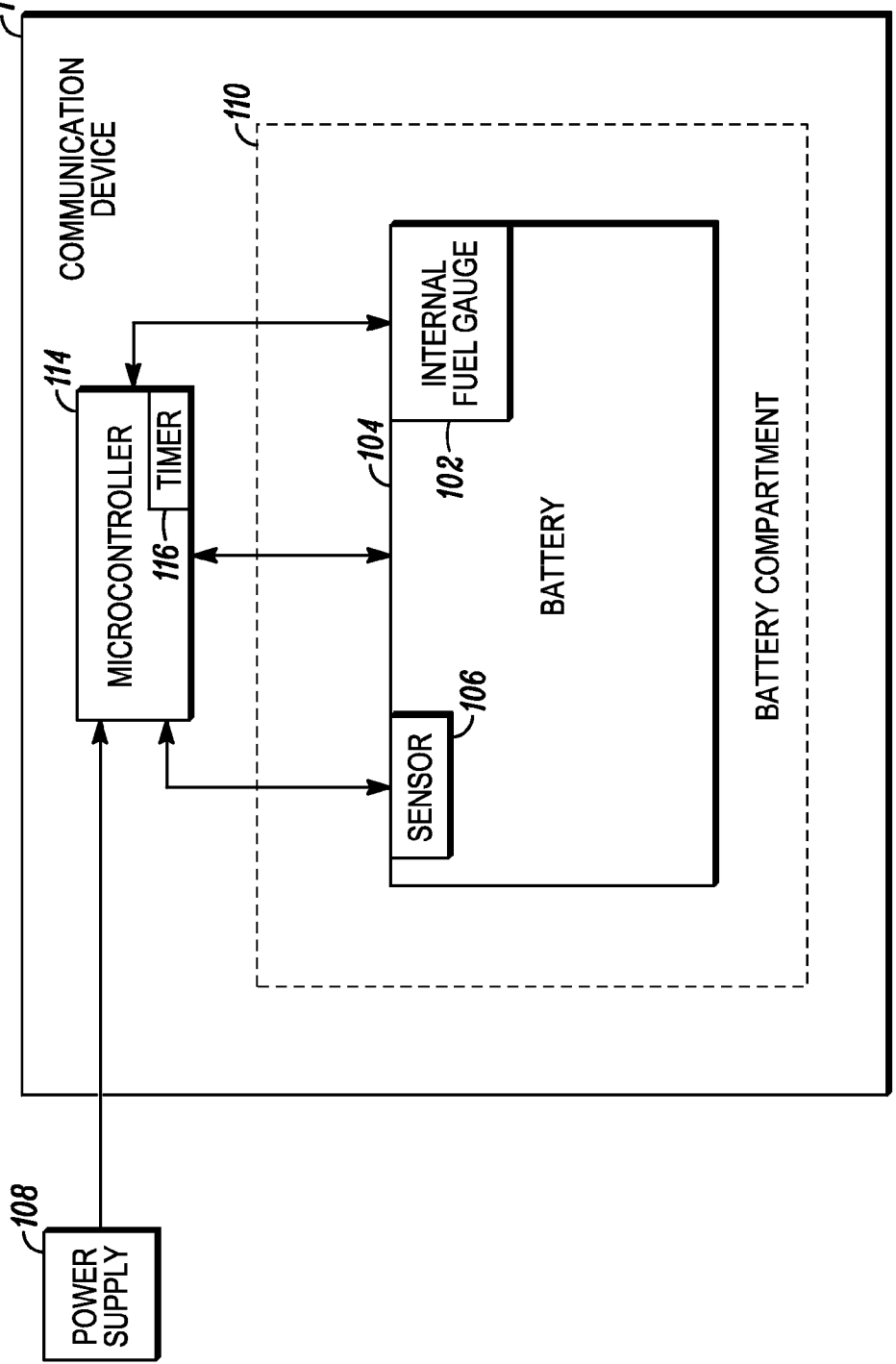
FIG. 1 is a block diagram of a communication device in accordance with some embodiments.

FIG. 1 illustrates a block diagram 100 of a communication device 112 in accordance with some embodiments. The communication device 112, coupled to a power supply 108, includes an internal fuel gauge 102, a battery 104, a temperature sensor 106, a battery compartment 110, a microcontroller 114, and a timer 116.

In accordance with an embodiment, the battery 104 may be a battery pack (not shown) that includes a plurality of cells. In accordance with the embodiment, the battery 104 includes the internal fuel gauge 102 that is communicatively coupled to the microcontroller 114 for determining charging status of the battery 104. The fuel gauge 102 is a device that is used to measure amount of energy available for consumption. The charging status indicated by the fuel gauge 102 represents an amount of charge in the battery 104. For example, the charging status of the internal fuel gauge 104 may indicate that the battery 104 is 90% charged or the battery 104 is 100% charged and so on. The internal fuel gauge 102 may be for example, a Dallas/Maxim DS2438 or other similar integrated fuel gauge component.

Further, the temperature sensor 106 is coupled to the battery 104 to sense the battery temperature and provide the sensed battery temperature to the microcontroller 114 of the communication device 112. The temperature sensor 106 may be one of a variety of temperature sensor devices available in the market place, such as those manufactured by Motorola Inc. and or other manufacturers. The temperature sensor 106 is preferably within the battery pack in an area that is best to measure the temperature of the cells. More particularly, an external pull-up resistor may be used to provide a voltage divider circuit that enables the microcontroller 114 to determine the battery temperature by measuring a voltage at the temperature contact on the battery 104 itself. The resistance of the temperature sensor 106 changes in response to temperature changes of the battery 104.

In accordance with the embodiment, the battery 104 is positioned inside the battery compartment 110 of the communication device 112, and the battery 104 is connected to the microcontroller 114 that controls charging of the battery 104. The microcontroller 114 is communicatively coupled to the power supply 108, the temperature sensor 106, and the internal fuel gauge 102. The microcontroller 114 receives charging status information and battery temperature information from the internal fuel gauge 102 and the temperature sensor 106, respectively. The microcontroller 114 then uses such received information for controlling the charging of the battery 104 by regulating the power supply to the battery 104. For example, the microcontroller 114 allows the power supply 108 to charge the battery 104 at a higher rate when the charging status of internal fuel gauge 102 indicates that the charge in the battery 104 is less than a certain value, e.g. the battery 104 is less than 90% charged. Similarly, the microcontroller 114 allows the power supply 108 to charge at a lower late when the charging status of the internal fuel gauge 102 indicates that the charge in the battery 104 is greater than or equal to a certain value, e.g. the battery 104 is greater than or equal to 90% charged. In one embodiment, the microcontroller may regulate the power supply 108 by discontinuing charge from the power supply 108 or temporarily terminating the charge from the power supply 108.

The microcontroller 114 includes the timer 116 and typically operates via a crystal, as known in art.

In accordance with the embodiment, the battery 104 is connected to the power supply 108 through the microcontroller 114. The power supply 108 may be any kind of power source that provides alternate current (AC) supply for charging the rechargeable battery 104. The alternate current (AC) and direct current (DC) conversion occurs by using the known circuits and technologies.

Operationally, the microcontroller 114 receives the sensed temperature of the battery 104 from the temperature sensor 106 while charging the battery 104. If the sensed temperature indicates that the battery temperature is less than a predetermined temperature threshold value, the microcontroller 114 continues charging the battery 104. The predetermined temperature threshold value represents a temperature below which the battery 104 may be operated safely. In one embodiment, the range below the temperature threshold value within which the battery is operated safely is known as safe operating temperature range of the battery 104.

On the other hand, if the sensed temperature indicates that the battery temperature is greater than the predetermined temperature threshold value, the microcontroller 114 monitors the charging status of the internal fuel gauge 102. The charging status of the internal fuel gauge 102 indicates an amount of charge in the battery 104. For example, the charging status indicates that the battery 104 is 90% charged or 95% charged, and so on.

Further, on determining the charging status of the battery 104, the microcontroller 114 determines if the charge in the battery 104 is less than a predetermined charge threshold value. The predetermined charge threshold value represents the charge value indicating that the battery 104 is 100% charged. If the charge in the battery 104 is less than the predetermined charge threshold value, the microcontroller 114 discontinues the charging of the battery 104 until the battery temperature falls below the predetermined temperature threshold value.

Further, as soon as the temperature drops below the predetermined temperature threshold value, the microcontroller 114 re-charges the battery 104. The above steps are continued until the battery 104 is fully charged i.e., until the charging status indicated by the internal fuel gauge 102 represents that the charge in the battery 104 is greater than or equal to the predetermined charge threshold value, for example the charging status indicates that the battery 104 is 100% charged.

On the other hand, if the charge in the battery 104 is greater or equal to the predetermined charge threshold value, the microcontroller 114 terminates the charging of the battery 104. Thus, the microcontroller 114 controls the charging of the battery 104 in the communication device 112.

Figure 2:
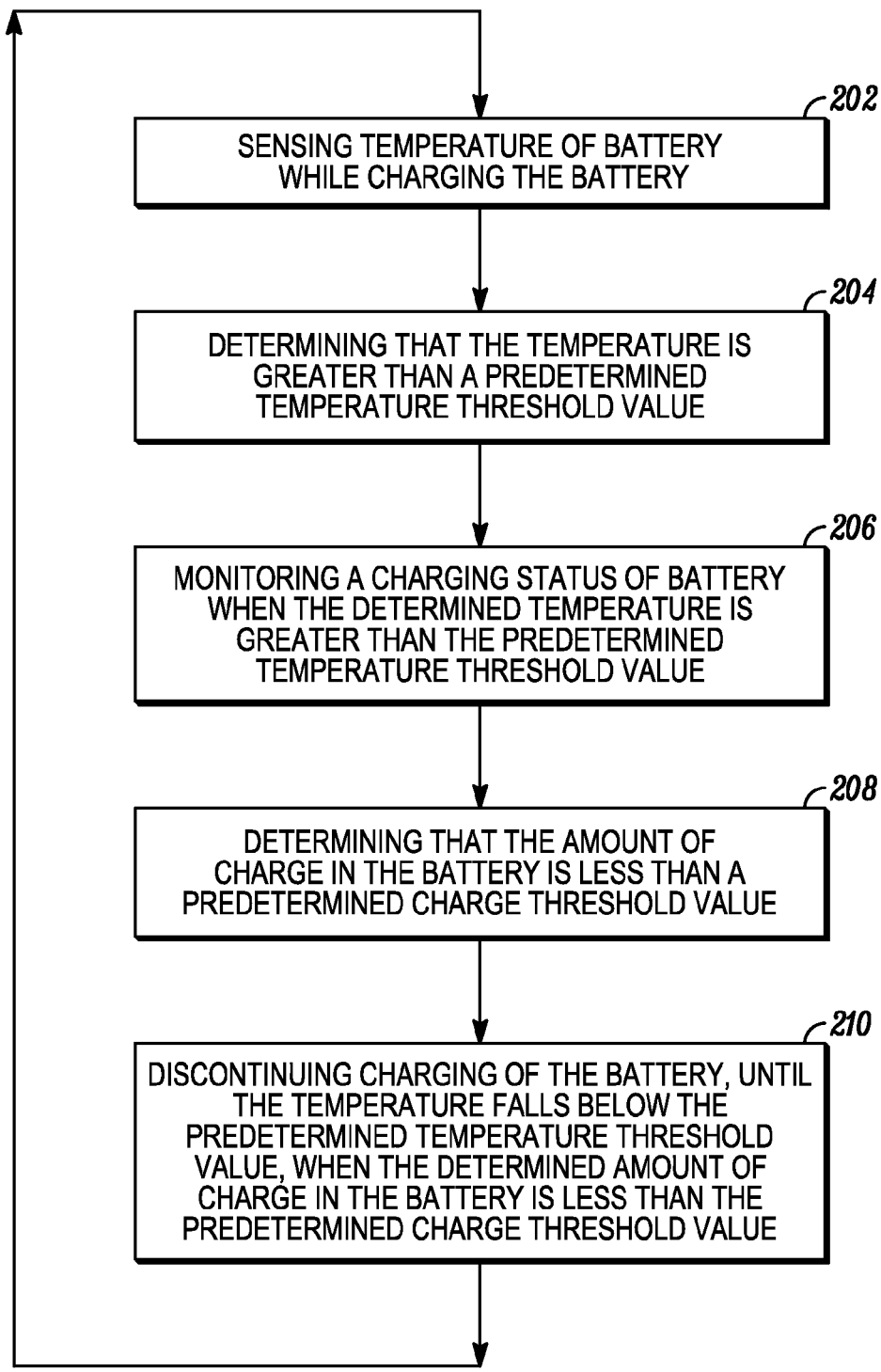
FIG. 2 is a flowchart of a method for controlling the charging of a battery in accordance with some embodiments.

FIG. 2 is a flowchart of a method 200 for controlling the charging of a battery 104 by using internal fuel gauge 102. The method 200 begins with a step of sensing 202 the temperature of the battery 104 while charging the battery 104. Upon sensing the temperature, the method then continues to step of determining 204 that the sensed temperature is greater than a predetermined temperature threshold value. The predetermined temperature threshold value represents a temperature value below which the battery may be operated safely.

After determining that the sensed temperature is greater than the predetermined temperature threshold value, the method 200 continues to a step of monitoring 206 charging status of the battery 104. The charging status of battery 104 indicates an amount of charge in the battery 104, as indicated by the internal fuel gauge 102. For example, the charging status may indicate that the battery 104 is less than 90% charged.

In one embodiment, the charging status is monitored by the microcontroller 114. The microcontroller 114 receives a sensor control signal, from the temperature sensor 106, indicating that the determined battery temperature is greater than the predetermined temperature threshold value. Upon receiving the sensor control signal, the microcontroller 114 requests the charging status from the internal fuel gauge 102 that indicates the amount of charge in the battery 104. In response to the sent request, the microcontroller 114 receives the charging status, from the internal fuel gauge 102 that is being used to monitor the amount of charge in the battery 104.

On monitoring the charging status of the battery 104, the method 200 then continues with a step of determining 208 that the charge in the battery 104 is less than a predetermined charge threshold value. The predetermined charge threshold value represents that the battery 104 is 100% charged or charged to its potential. If the charge in the battery 104 is less than the predetermined charge threshold value, the method 200 then continues with a step of discontinuing 210 the charging of battery 104 until the temperature falls below the predetermined temperature threshold value. In other words, the charging of the battery 104 is discontinued until the temperature of the battery falls within the safe operating temperature range.

In one embodiment, the microcontroller discontinues the charging of the battery 104. The microcontroller 114 receives a fuel gauge control signal from the internal fuel gauge 102 that indicates that the determined amount of charge in the battery 104 is less than the predetermined charge threshold value. Further, the microcontroller 114 disconnects the power supply 108 that is utilized for charging the battery 104 until the battery temperature falls below the predetermined temperature threshold value.

In one embodiment, the battery 104 is re-charged when the temperature drops below the predetermined temperature threshold value.

In one embodiment, at the step of determining 208, if the amount of charge in the battery 104 is greater than the predetermined charge threshold value, the microcontroller 104 terminates the charging of the battery 104.

The method 200 repeats from the step of sensing 202 temperature to the step of discontinuing 210 the charging of the battery, until the battery is charged to 100% or charged to its potential.

Figure 3:
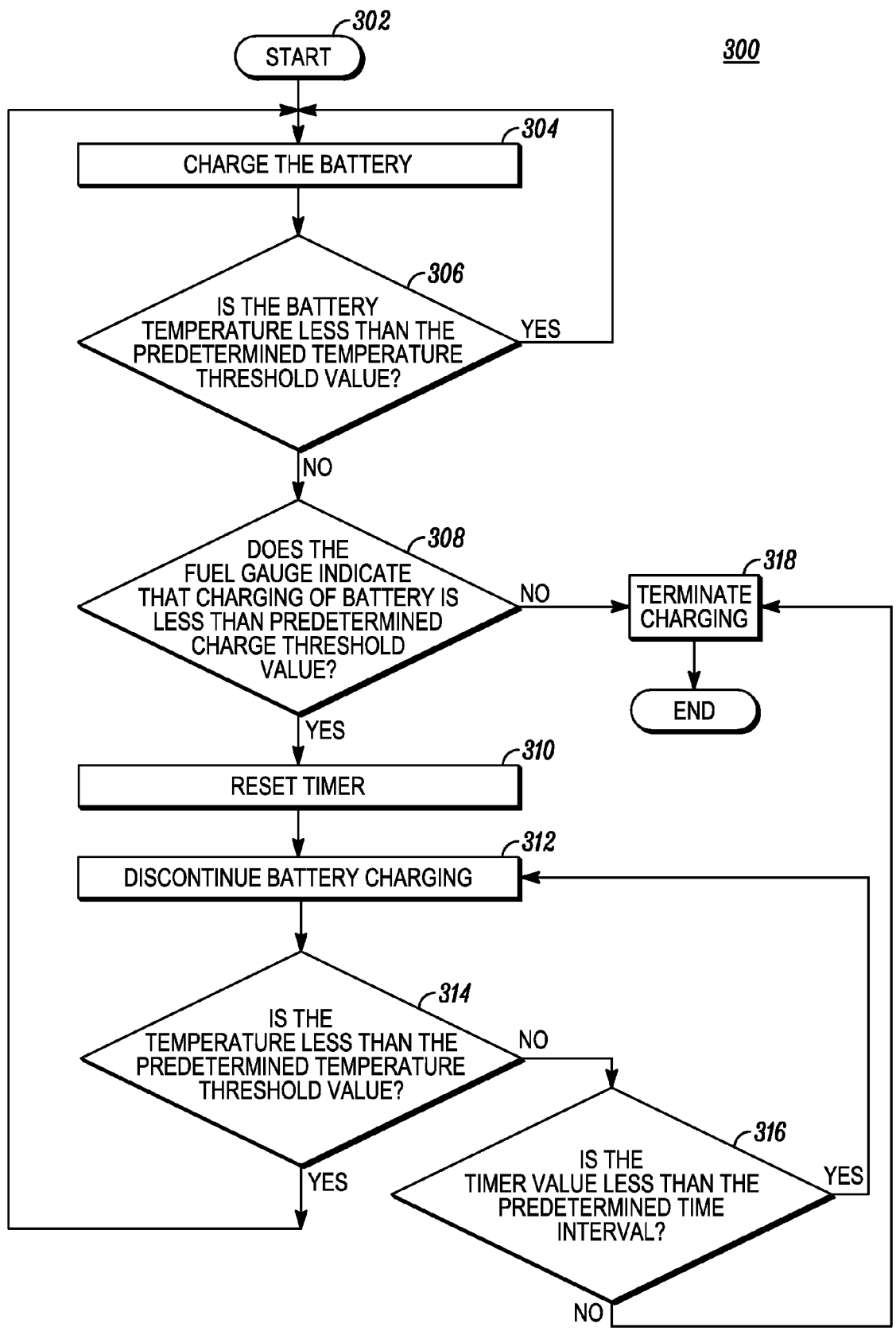
FIG. 3 is a detailed flowchart presenting a method for controlling the charging of a battery in accordance with some embodiments.

FIG. 3 is a detailed flowchart of the method 300 for controlling the charging of the battery 104. The method 300 starts with a step of charging 304 the battery 104. The method 300 then continues with a step of determining 306 whether the battery temperature is less than a predetermined temperature threshold value. If the battery temperature is less than the predetermined temperature threshold value, the method 300 returns to the step of charging 304 the battery 104.

On the other hand, at the step of determining 306, if the battery temperature is greater than the predetermined temperature threshold value, the method 300 continues to a step of determining 308 whether the charging status of the battery 104 is less than a predetermined charge threshold value. In one embodiment, the microcontroller 114 determines the charging status of the battery 104 based on the charging status information received from the internal fuel gauge 102 of the battery 104.

Further, if the charging status of the battery is less than the predetermined charge threshold value, the method 300 continues to a step of resetting 310 a timer 116, where the timer 116 is set to an initial value, for example zero. In one embodiment, resetting the timer 116 includes initiating the timer 116 to start counting the time until the temperature falls below the predetermined threshold value. The timer 116 is used to keep track of the time elapsed after resetting the timer 116. The method 300 then continues to a step of discontinuing 312 the charging of the battery 104 until the battery temperature falls below the predetermined temperature threshold value as determined at 314.

Furthermore, at the step of determining 314, once the battery temperature is less than the predetermined temperature threshold value i.e., the battery temperature falls within the safe operating temperature range, the battery 104 is re-charged and the method 300 continues to the step of charging 304 the battery 104. In one embodiment, the battery 104 is re-charged by power supply 108.

On the other hand, at the step of determining 314, if the battery temperature is greater than the predetermined threshold value, the method 300 then continues to the step of determining 316 that determines whether timer value of timer 116 is greater than a predetermined time interval. The predetermined time interval is a time period within which the microcontroller 114 waits for the temperature to fall below the predetermined temperature threshold value.

At the step of determining 316, if the timer value is less than the predetermined time interval, the method 300 continues to the step of discontinuing 312 the charging of the battery 104. On the other hand, at the step of determining 316, if the timer value is greater than the predetermined time interval, the method 300 continues to a step of terminating 318 the charging of the battery 104.

Further, at the step of determining 308, if the charging status of the battery 104 is greater than a predetermined charge threshold value, the method 300 continues to the step of terminating 318 the charging of the battery 104, and the method 300 ends.

Thus, the method 300 repeats the above steps until the charging status represents that the charge in the battery 104 is greater than or equal to the predetermined charge threshold value.

Accordingly, there has been provided a method and apparatus for controlling charging of the battery in the communication device.

Thus, the battery is charged to its full potential irrespective of the temperature variations which may be due to change in impedance of the battery, changes in temperature of any physical mass attached to the battery, and changes in amount of energy delivered to the battery. The method is particularly beneficial to batteries being charged while coupled to their communication devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A method for controlling charging of a battery in a communication device, the method comprising:
   sensing temperature of the battery while charging the battery;
   determining that the temperature is greater than a predetermined temperature threshold value;
   monitoring a charging status of the battery when the determined temperature is greater than the predetermined temperature threshold value, wherein the charging status indicates an amount of charge in the battery;
   determining that the amount of charge in the battery is less than a predetermined charge threshold value; and
   discontinuing charging of the battery, until the temperature falls below the predetermined temperature threshold value, when the determined amount of charge in the battery is less than the predetermined charge threshold value.

2. The method of claim 1 further comprising:
   re-charging the battery when the temperature falls below the predetermined temperature threshold value.

3. The method of claim 2, wherein the battery is re-charged by connecting a power supply that is utilized for charging the battery.

4. The method of claim 3, wherein discontinuing the charging of the battery further comprises:
   receiving a second control signal indicating that the determined amount of charge in the battery is less than the predetermined charge threshold value; and
   disconnecting the power supply that is utilized for charging the battery while the temperature is greater that the predetermined temperature threshold value.

5. The method of claim 1 further comprising terminating the charging of the battery when the determined amount of charge in the battery is greater than the predetermined charge threshold value.

6. The method of claim 1 further comprising charging the battery when the temperature is less than the predetermined temperature threshold value.

7. The method of claim 1, wherein monitoring the charging status of the battery further comprises:
   receiving a first control signal indicating that the determined battery temperature is greater than the predetermined temperature threshold value;
   requesting the charging status indicating the amount of charge in the battery in response to the received first control signal; and
   receiving the requested charging status to monitor the amount of charge in the battery.

8. An apparatus for controlling charging of a battery in a communication device, the apparatus comprising:
   a battery;
   a fuel gauge positioned inside the battery for monitoring charging status that indicates an amount of charge in the battery;
   a sensor positioned inside the battery for sensing temperature of the battery; and
   a microcontroller coupled to the battery for controlling the charging of the battery based on the monitored charging status indicated by the fuel gauge and the battery temperature determined by the sensor, wherein the microcontroller monitors the charging status when the temperature sensed by the sensor is greater than a predetermined temperature threshold value.

9. The apparatus of claim 8, wherein the microcontroller determines that the amount of charge in the battery is less than a predetermined charge threshold value, resets a timer, and discontinues charging of the battery, until the temperature falls below the predetermined temperature threshold value and timer value is less than a predetermined time interval.

10. The apparatus of claim 9, wherein the microcontroller terminates the charging of the battery when the determined amount of charge in the battery is greater than the predetermined charge threshold value of the battery.

11. The apparatus of claim 8, wherein the microcontroller re-charges the battery when the temperature falls below the predetermined temperature threshold value.

12. The apparatus of claim 11, wherein the microcontroller re-charges the battery by connecting a power supply that is utilized for charging the battery.

13. The apparatus of claim 8, wherein the microcontroller charges the battery when the temperature is less than the predetermined temperature threshold value.

14. The apparatus of claim 8, wherein the microcontroller;
   receives a first control signal from the sensor indicating that the determined temperature of the battery is greater than the predetermined temperature threshold value;
   requests the charging status indicating the amount of charge in the battery in response to the received first control signal; and
   receives the requested charging status to monitor the amount of charge in the battery.

15. The apparatus of claim 14, wherein the microcontroller:
   discontinues the charging of the battery by receiving a second control signal indicating that the determined amount of charge in the battery is less than the predetermined charge threshold value; and
   disconnecting power supply that is utilized for charging the battery until the temperature falls below the predetermined temperature threshold value.

16. The apparatus of claim 15, wherein the microcontroller includes a timer that is set to an initial value, and is used for monitoring a time interval within which the temperature falls below the predetermined threshold value.

* * * * *